US006926611B2

(12) United States Patent
Rivin

(10) Patent No.: US 6,926,611 B2
(45) Date of Patent: Aug. 9, 2005

(54) UNIVERSAL CARDAN JOINT WITH ELASTOMERIC BEARINGS

(76) Inventor: Eugeny I. Rivin, 4227 Foxpointe Dr, West Bloomfield, MI (US) 48323

( * ) Notice: Subject to any disclaimer, the term of this patent is extended or adjusted under 35 U.S.C. 154(b) by 0 days.

(21) Appl. No.: 10/144,071

(22) Filed: May 11, 2002

(65) Prior Publication Data

US 2003/0211894 A1 Nov. 13, 2003

(51) Int. Cl.[7] ............................................... F16D 3/38
(52) U.S. Cl. ........................ 464/70; 464/128; 464/132
(58) Field of Search ......................... 464/70, 128, 131, 464/132, 136; 384/297; 428/36.91

(56) References Cited

U.S. PATENT DOCUMENTS

| 1,768,759 | A | * | 7/1930 | Harris | 464/70 |
| 1,881,326 | A | * | 10/1932 | Peters | 464/70 |
| 2,354,445 | A | * | 7/1944 | Grubbs | 384/297 X |
| 2,727,370 | A | * | 12/1955 | Holland | 464/70 |
| 3,074,255 | A | * | 1/1963 | Reinecke | 464/128 |
| 3,504,905 | A | * | 4/1970 | Irwin | 384/297 X |
| 3,545,232 | A | * | 12/1970 | Neese et al. | 464/131 |
| 3,645,115 | A | * | 2/1972 | Shotwell et al. | 464/70 |
| 5,062,730 | A | * | 11/1991 | Tomii et al. | 464/132 X |
| 6,319,131 | B1 | * | 11/2001 | Lindenthal | 464/132 |

FOREIGN PATENT DOCUMENTS

| GB | 458530 | * | 12/1936 | | 464/70 |
| SU | 268805 | * | 4/1970 | | 464/70 |
| SU | 588411 | * | 1/1978 | | 464/132 |

OTHER PUBLICATIONS

E.I. Rivin, "Properties and Prospective Applications of Ultra Thin Layered Rubber–Metal Laminates for Limited Travel Bearings", Tribology International, 1983, vol. 16., No. 1, pp. 17–25.

E.I. Rivin, "Shaped Elastometric Components for Vibration Control Devices," SV Sound and Vibration, 1999, vol. 33, No. 7, pp. 18–23.

* cited by examiner

Primary Examiner—Greg Binda
(74) Attorney, Agent, or Firm—Gifford, Krass, Groh Sprinkle, Anderson & Citkowski, PC

(57) ABSTRACT

Universal cardan joint with elastomeric bearings in which the elastomeric bearings are preloaded in compress and comprise laminated segments with reduced resistance to shear deformation or comprise rubber cords providing for reduced torsional stiffness.

11 Claims, 5 Drawing Sheets

UNIVERSAL CARDAN JOINT WITH ELASTOMERIC BEARINGS

FIELD OF THE INVENTION

The present invention relates to power transmission components.

BACKGROUND OF THE INVENTION

Many mechanical systems contain power transmission devices whose typical role is transmission of mechanical energy, usually rotation from an electrical internal combustion, etc., motor to the working organ, such as wheels in surface vehicles.

In many instances, the mechanical rotation must be transmitted between rotatably mounted components whose axes of rotation intersect and are at an angle with each other, either by design such as in steel mills, or due to specifics of operation of the mechanical system. For example, even if the driveshaft of a rear-wheel-drive vehicle is coaxial with the output shaft of its transmission when the vehicle is moving along an ideally flat surface, this changes when the driven rear wheels change their level relative to the front wheels due to an uneven road.

Transmission of rotational motion between two mechanical components (shafts) with intersecting axes can be smoothly performed when the shafts are connected by a universal or cardan joint. In a typical commercially available universal cardan joint there are two yokes, attached to connected shafts, and an intermediate cross-shaped member having four legs extended ouwardly at 90 deg. to each other in the plane perpendicular to the axis of the cross-shaped member, with the free end of each leg being trunnion-shaped. The trunnions are connected with bores in the yokes by means of sliding or rolling bearings. If the shafts connected by the universal joint are inclined at angle α to each other, then continuous rotation of these shafts is accompanied by oscillatory rotations of the trunnions in their bearings with angular amplitude α, while the torque acting along the shaft system is transmitted by tangential forces acting as radial forces on the trunnion bearings. It is known that such an oscillatory regime of heavily loaded bearings is associated with reduced load ratings of both sliding and rolling bearings, especially for small magnitudes of α. As a consequence, relatively large bearings and thus, large universal joints are required for a given transmitted torque. Such universal joints require good lubrication and are very sensitive to dirt and other contamination, thus requiring elaborate seals.

Most of commercially available universal joints have trunnions being supported in relation to yokes by journal (radial) bearings. However, there are cases wherein some axial forces might be generated in the trunnion-yoke connection, and such forces have to be accommodated by thrust bearings. Since the thrust bearings are also exposed to oscillating motions, both sliding and rolling thrust bearings have to be derated for the universal joint applications. Use of the enlarged sliding or rolling thrust bearings on each trunnion may significantly contribute to size, weight, and cost of the joint.

It is long known that so-called "thin-layered rubber-metal laminates" comprising thin layers of an elastomeric (rubber-like) material alternating with and bonded to thin layers of a rigid material, such as metal, woven fiber mat, etc., can accommodate very high compressive forces, up to and exceeding 250 MPa (~37,000 psi) while retaining very low resistance to shear deformation (low shear stiffness) in the direction perpendicular to the compression force. As a result, such laminates can be used as bearings for limited displacements, e.g see E. I. Rivin, *"Properties and Prospective Applications of Ultra Thin Layered Rubber-Metal Laminates for Limited Travel Bearings,"* Tribology International, 1983, Vol. 16, No. 1, pp. 17–25.

Since conditions in the universal joints require bearings for limited displacements, there are several teachings of universal joint designs using rubber-metal laminated bearing sleeves, e.g. see the prior art design in FIGS. 1 and 2 from the above-quoted article. This prior art universal joint 11 connects shafts 19 and 20 and comprises yokes 12, 13, intermediate cross-shaped member 14 with trunnions 15a,b and 16a,b and rubber-metal laminated bearing sleeves 17a,b and 18a,b. In operation, the tangential force is accommodated by radial compression of the rubber-metal laminated bearing sleeves, while the oscillatory motions of the trunnions in the bores of the yokes are accommodated by shear deformations of the laminated bearing sleeves. Obviously, such a design does not require lubrication and is insensitive to contamination since it is, essentially, the solid-state design. However, use of bearing sleeves as shown in FIGS. 1 and 2 requires relatively large shear forces in order to deform the sleeves for oscillating within angles ±α. In the same time, compression forces which can be safely accommodated by these sleeves are much larger than forces transmitted by a given size joint, due to quoted above extremely high allowable compression forces on thin-layer rubber-metal laminates.

Radial precompression (preloading) of thin-layered rubber-metal laminates is very important for enhancing radial stiffness of the bearing sleeves (thus, providing for high torsional stiffness of the joint), as well as for better fatigue properties of the laminated sleeves. However, the radial preload of the bearing sleeves is difficult if at all possible to achieve in the design in FIGS. 1, 2.

Another disadvantage of the design in FIGS. 1 and 2 is a potential difficulty of its assembly and, especially, disassembly. The assembly should involve interference fits of bearing sleeves 17, 18 in the annular clearances between trunnions 15 and 16 and the bores in the respective yokes 12 and 13. Since looseness of the bearing sleeves is highly undesirable, the interference fits should be achieved simultaneously between the sleeves and the bores and between the sleeves and the trunnions. This combination requires a complex manufacturing sequence with high accuracies of the fitting components. Disassembly of such a connection would be very difficult.

The rubber-metal laminated bearing sleeves with solid rubber layers as shown in FIGS. 1 and 2 as 17, 18 have very high compression stiffness and very high allowable compression forces. However, there are cases wherein much lower torsional stiffness of the joint is desirable, even at the price of a reduced torque rating.

The proposed invention allows to eliminate the above shortcomings and to comply with the diverse specifications, e.g. relative to the torsional stiffness, while retaining the positive features of the prior art design as shown in FIGS. 1 and 2.

SUMMARY OF THE INVENTION

The present invention addresses shortcomings of the prior art by providing a universal joint with elastomeric bearings whose elastomeric bearing sleeves assure an adequately high torque rating of the joint while having significantly reduced resistance to the oscillatory motions between the trunnions and the yokes.

The present invention allows to simplify thrust bearings when they are required for trunnions of universal joints.

This invention also improves performance characteristics (torsional stiffness) and fatigue endurance of the elastomeric bearing sleeves by allowing their radial preloading.

The present invention allows to retain beneficial properties of the prior art universal joints with elastomeric bearings while providing for increased torsional compliance and damping.

The present invention further provides for easy assembly and disassembly of the joint with elastomeric bearing sleeves with the required preload but without creating a need for high accuracy machining of the parts.

BRIEF DESCRIPTION OF THE DRAWINGS

The present invention can be best understood with reference to the following detailed description and drawings, in which.

DETAILED DESCRIPTION OF THE PREFERRED EMBODIMENTS

Figure 1:
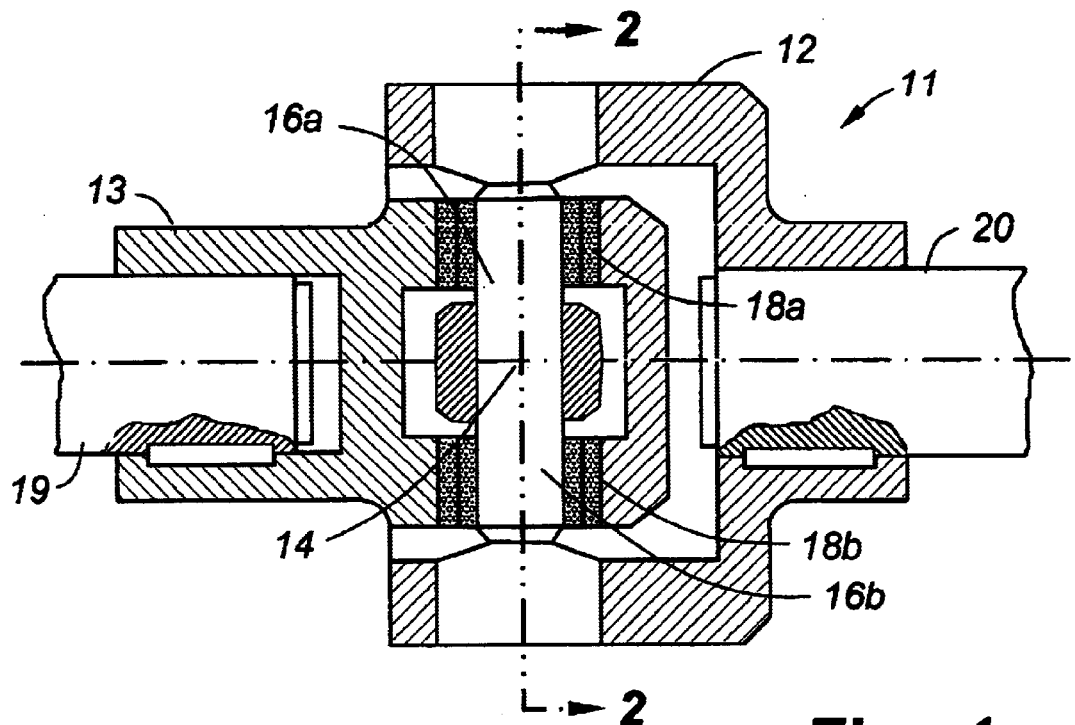
FIG. 1 provides an axial cross section of the prior art universal joint with elastomeric bearing sleeves.
Figure 2:
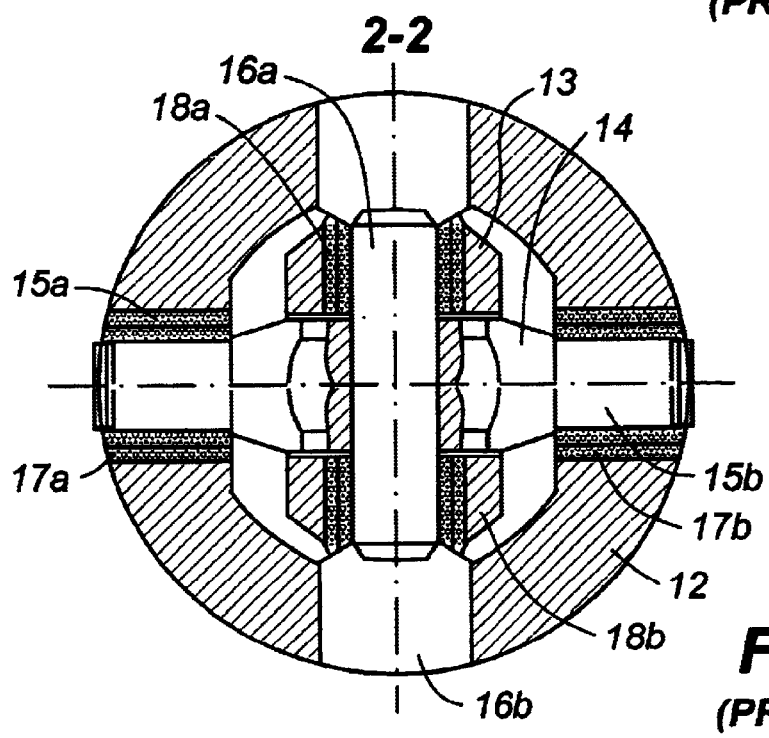
FIG. 2 shows 2—2 cross section of the prior art universal joint as indicated in FIG. 1.
Figure 3:
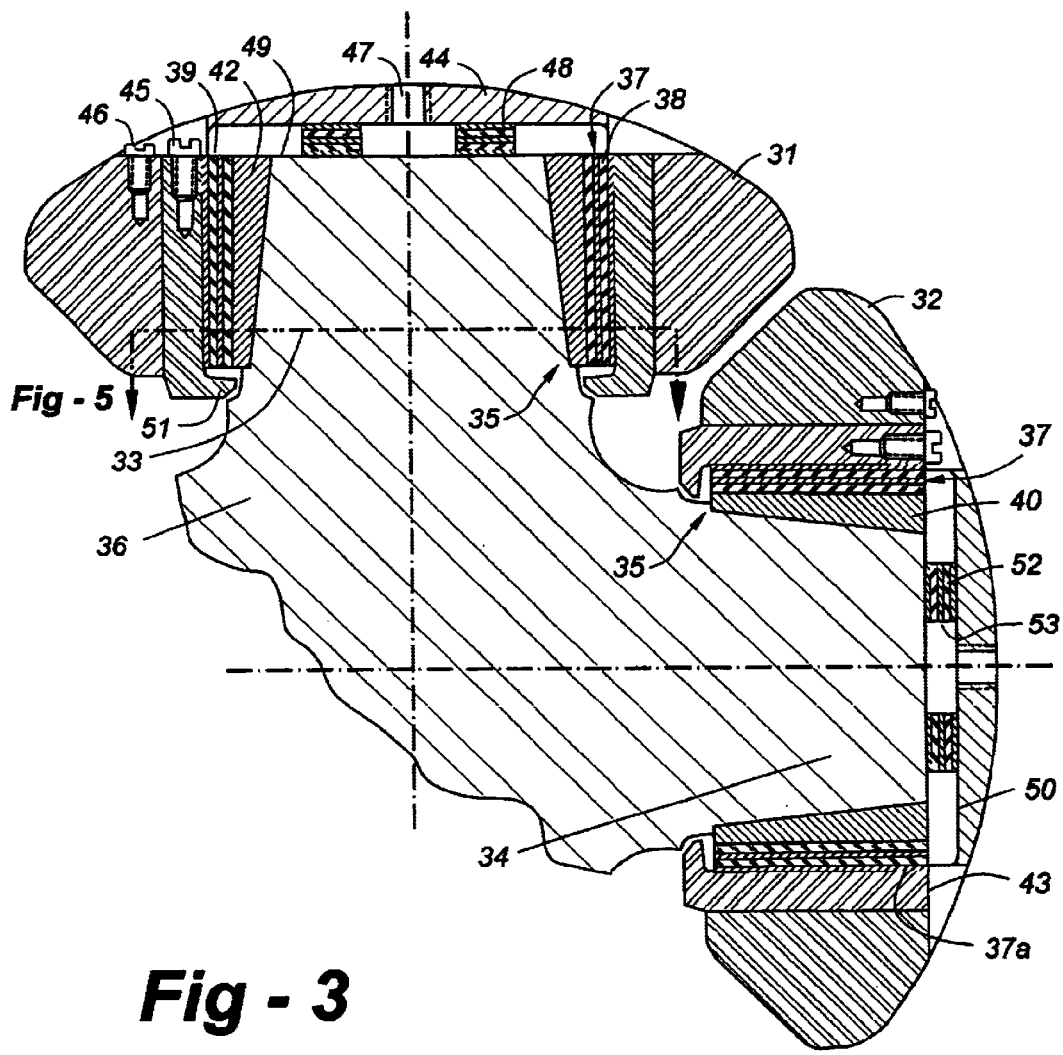
FIG. 3 shows a fractional cross section of the proposed universal joint having elastomeric bearing sleeves with cylindrical rubber-metal laminates by the plane passing through the center of the cross-shaped member and perpendicular to the rotational axis of the joint in the connection when it is connecting shafts without angular misalignment.

Referring to FIG. 3, it is showing two (out of four constituting the universal joint) basic units "yoke—trunnion—elastomeric bearing sleeve". Partially shown cross-shaped member 36 is connected with yoke 31 via trunnions 33 and elastomeric bearing sleeves 35, and with yoke 32 via trunnions 34 and elastomeric sleeves 35. Yokes 31 and 32 are attached to the respective connected shafts (not shown).

Figure 4:
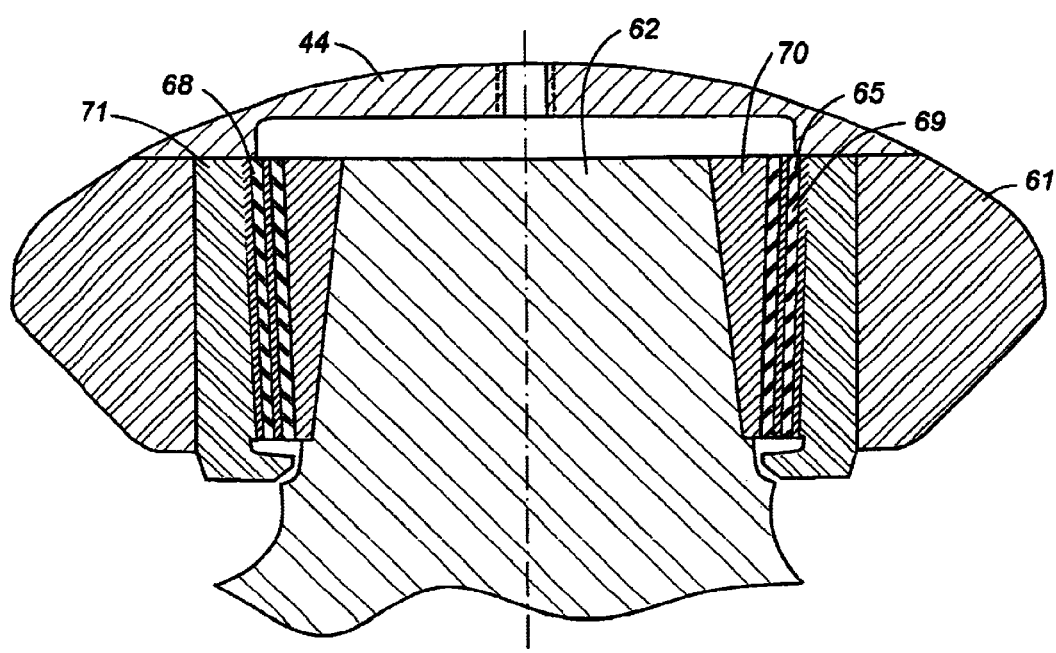
FIG. 4 shows a fractional cross section of the proposed universal joint having elastomeric bearing sleeve with tapered rubber-metal laminates by the plane passing through the center of the cross-shaped member and perpendicular to the rotational axis of the joint when it is connecting shafts without angular misalignment.

Elastomeric bearing sleeves 35 comprise rubber-metal laminates 37 having sleeve-like rubber layers 38 (two are shown) and separating them (and bonded to them) sleeve-like thin reinforcing intermediate metal layers 39 (one is shown) and inner (innermost) 40 and outer (outermost) 41 sleeve-like metal layers bonded to the extreme inner and outer sleeve-like rubber layers. For simpler fabrication, the inner and/or outer sleeve-like metal layers may include thin intermediate metal layers 39a bonded to the extreme rubber layer and to inner and/or outer metal layers 40, 41. Such arrangement is shown in FIG. 3 in relation to outer sleeve-like layers 41. Cylindrical sleeve-like rubber layers 38 and intermediate sleeve-like metal layers 39 are shown in FIG. 3. However, these layers can also have conical shapes as shown in FIG. 4. Term "metal" is used in this Specification and in the claims in a generalized sense; while metal reinforcing layers are generally used in current applications of the thin-layered laminates, other materials having high strength and rigidity can be beneficially used for these applications, such as fiber-reinforced composites, etc. The inner 40 and outer 41 metal layers of the laminated bearing sleeve are made thicker than the intermediate metal layers since they determine the overall shape of elastomeric bearing sleeves 35.

In the embodiment shown in FIG. 3, the inner surfaces of inner layers 40 are made tapered and conforming with the tapered outer surfaces of trunnions 33, 34. The outer surfaces of outer layers 41 are made cylindrical and conforming with the internal cylindrical surfaces of the bores in yoke 31.

Bearing sleeves 35 are kept in place by covers 44 abutting end surfaces 43 of outer metal layers 41. Covers 44 are fastened to outer metal layers 41 by mechanical fasteners 45 (bolts are shown but other appropriate fastening means can be used), and to yokes 31, 32 by mechanical fasteners 46 (bolts are shown but other appropriate fastening means can be used). Threaded hole 47 is provided in the center of cover 44. Threaded hole 47 can be plugged when not in use (see below).

Flat rubber-metal laminates 48 can be installed between end surfaces 49 of trunnions 33, 34 and internal surfaces 50 of covers 44 to serve as thrust bearings for cross-shaped member 34.

Before assembly, wall thickness of elastomeric bearing sleeves 35 (each being a sum of total thickness of rubber layers 38, intermediate metal layers 39 and 39a, and inner and outer metal layers 40 and 41) is larger than the annular space between the inside surfaces of the bores in yokes 31, 32 and the respective outside surfaces of trunnions 33, 34. The difference between the wall thickness of the bearing sleeve and the available annular space is equal to the specified preloading compression deformation of the elastomeric bearing sleeve. To perform the assembly operation, the tapered bearing sleeve is inserted into the wider opening of the tapered annular space between the internal surface of the bore and the external surface of the trunnion and pressed inside of this space by a punch shaped to contact simultaneously both end surfaces: 42 of inner sleeve-like metal layer 40 and 43 of outer sleeve-like metal layer 41. Wedge action of the tapered connection between the conforming inner surface of metal layer 40 and outer surface of trunnion 33 results in expansion of metal layer 40, in compression (preloading) of rubber layers 38, and in gradual full insertion of bearing sleeve 35 into the annular space between the yoke and the trunnion. The simultaneous contact between the pressing punch and both end surfaces of inner metal layer 40 and outer metal layer 41 assures insertion of the bearing sleeve without inducing axial shear deformation inside bearing sleeve 35 which can cause distortion or even damage of the bearing sleeve.

To disassemble the connection, firstly bolts 46 attaching cover 44 to yoke 31 and 32 are removed, and then a bolt is threaded into central hole 47 of cover 44 until contacting with end surface 49 of trunnion 33 or 34. After the contact is established, further threading of the bolt into hole 47 causes outside movement of cover 44 together with outer metal layer of the bearing sleeve, to which cover 44 is attached by bolts 45. The initial outside-directed movement causes shear deformation in rubber layers 38, until disassembly protrusions 51 engage with inner metal layer 40, thus resulting in extraction of elastomeric bearing sleeve 35.

Obviously, instead of the arrangement shown in FIG. 3 wherein there is the tapered contact surface between the bearing sleeve and the trunnion, other similar arrangements can be made. The tapered contact can be designed between the bearing sleeve and the bore or, if warranted, both sides of the bearing sleeve may be designed having tapered contact surfaces with the yoke and the trunnion.

FIG. 3 shows an embodiment of the universal joint according to the present invention wherein thrust forces between trunnions and yokes are accommodated. This is achieved by rubber-metal laminated elements 48 comprising preferably flat rubber layers 52 (two are shown) and metal layers 53 (three are shown). Laminated elements 48 can be embodied as laminated washers or as sets of independent laminated pads. Compression preloading is achieved by dimensioning the space between cover 44 and end surface 49 of the trunnion, so that after fastening covers 44 to the yoke on both sides of cross-shaped member 36, the specified preload magnitude is realized.

A different embodiment of thrust accommodation is shown in FIG. 4 wherein one unit "yoke 61-elastomeric bearing sleeve 65-trunnion 62" is shown. In this design elastomeric bearing sleeve 65 is made conical, comprising sleeve-like rubber layers 68 and sleeve-like conical metal layers 69. Inner metal layer 70 and outer metal layer 71 are similar to the design in FIG. 3. Attachments of cover 44 to yoke 61 and outer metal layer 71 are not shown.

The conical shape, while not significantly influencing circumferential shear properties of the bearing sleeves, dramatically changes their deformation properties in the axial direction, making the bearing sleeves much stiffer in the axial direction and eliminating the need for special thrust bearings. The axial stiffness can be reduced or increased by modification of the conicity angle of the laminated bearing sleeve.

Figure 5:
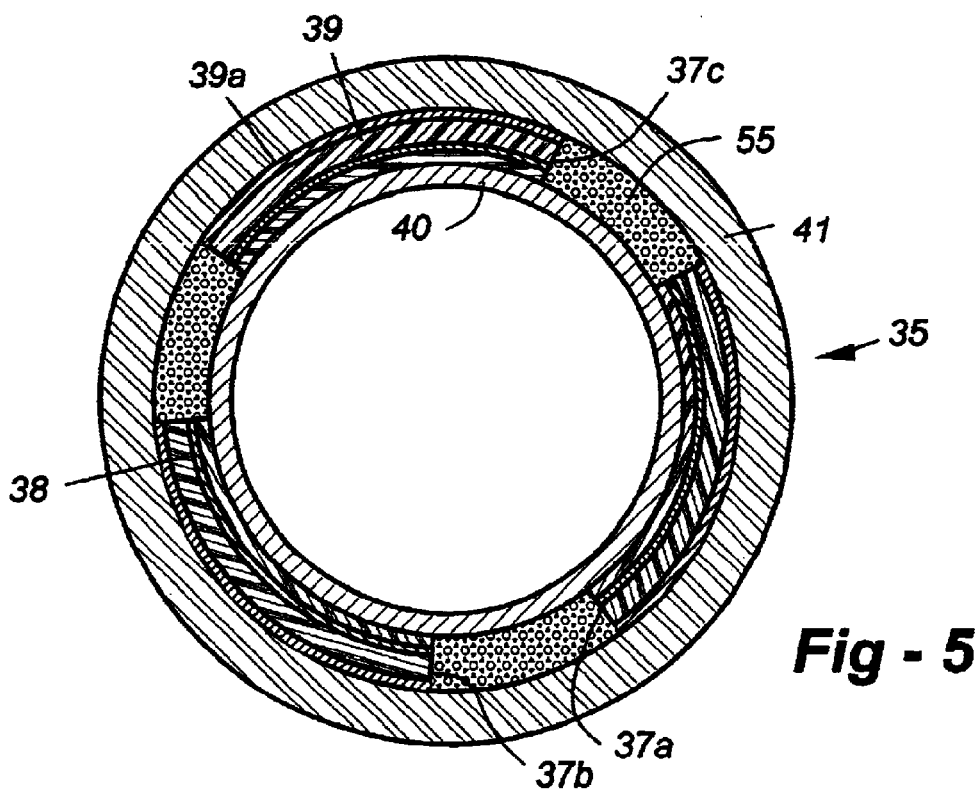
FIG. 5 gives cross section 5—5 perpendicular to the axis of the elastomeric bearing sleeve of one embodiment of the elastomeric bearing sleeve in FIG. 3 according to the present invention wherein the sleeve comprises three segments of a rubber-metal laminate material, and inner and outer metal layers are solid.

FIG. 5 shows cross section 5—5 of elastomeric bearing sleeve 35 in FIG. 3 showing sleeve-like rubber layers 38. The rubber-metal laminated structure 37 composed of sleeve-like rubber layers 38 and sleeve-like intermediate metal layers 39 is circumferentially divided into segments 37a,b,c (of course, a different number of segments can be used). Such a configuration reduces the surface area of laminate 37 and consequently reduces its allowable radial loading and also its resistance to shear deformation. While the former does not affect performance characteristics of the elastomeric bearing sleeves since the above compressive strength data (250 MPa/37,000 psi) indicate large compressive strength reserves, the latter (reduction of shear resistance) is always very beneficial.

In some applications, voids between segments 37a,b,c are undesirable since they may accumulate dirt, etc. Such accumulation is prevented by filling the voids with filling 55, preferably composed from a flexible foam material, but alternatively composed from other soft materials not influencing noticeably the shear deformation resistance of laminated segments 37.

Figure 6:
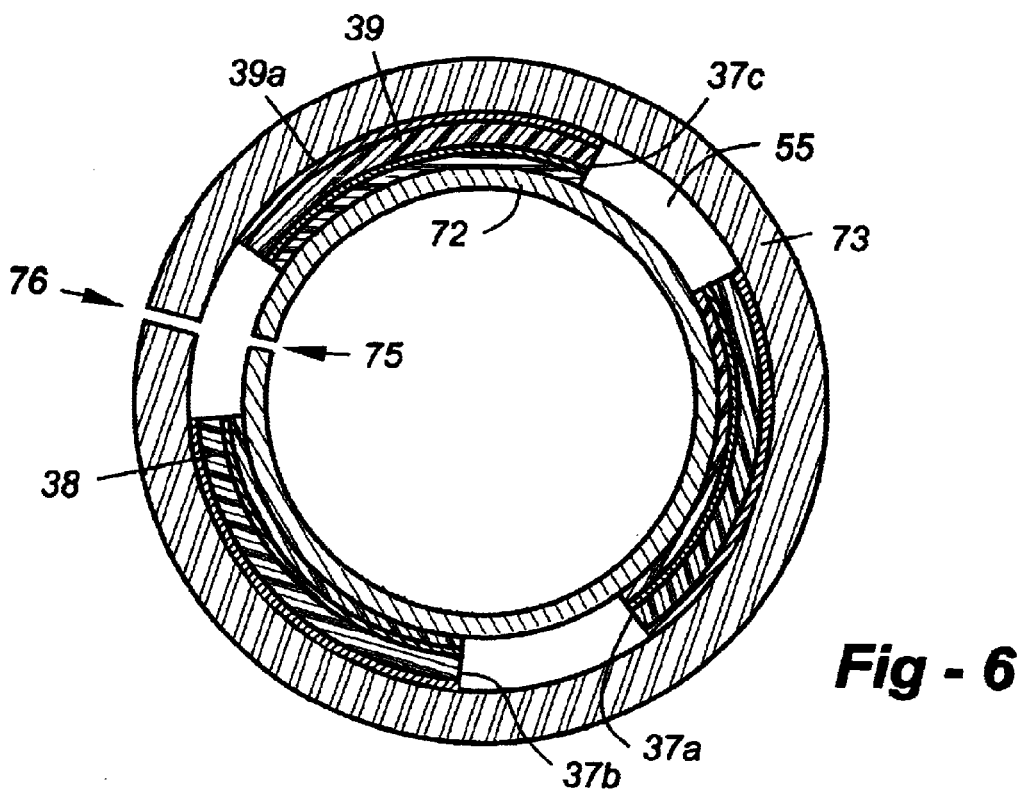
FIG. 6 gives cross section perpendicular to the axis of the elastomeric bearing sleeve through an alternative embodiment of the elastomeric bearing sleeve according to the present invention wherein the sleeve comprises three segments of a rubber-metal laminate material, and inner and outer metal layers are slotted.

For the elastomeric bearing sleeve illustrated in FIG. 5, preloading of laminated segments 37a,b,c during the assembly procedure described above involves a uniform compression of outer sleeve-like metal layer 41 and uniform expansion of inner sleeve-like metal layer 40. These deformations may require substantial axial force inputs during the assembly procedure. The required force inputs are substantially reduced with elastomeric bearing sleeve 37 designed as shown in FIG. 6. In this design, both inner sleeve-like metal layer 72 and outer sleeve-like metal layer 73 are split by slots 75, 76, respectively. With this configuration, the axial force applied to the elastomeric bearing sleeve during the assembly procedure would be required, essentially, only for compressing rubber layers in laminated segments 37a,b,c. Only a minimum amount of force is needed for expanding inner metal layer 40 and for constricting outer metal layer 41 after they are weakened by slots 75 and 76. Depending on the design requirements, only one (inner 40 or outer 41) metal layer may be cut, while both are shown cut in FIG. 6.

Solid rubber layers used in laminated segments constituting elastomeric bearing sleeve 37 in FIGS. 5 and 6 provide both the exceptional compression strength and very high compression (radial) stiffness. The latter translates into high torsional stiffness of a universal cardan joint using such bearings. While in many applications the high torsional stiffness is desirable, in some applications a lower torsional stiffness is desirable in order to reduce torsional vibrations in the drive system. The desired reduction of the torsional stiffness may justify a reduction of the allowable torque transmitted by the joint (torque rating). This modification of performance characteristics is achieved with the embodiments of laminated elastomeric bearing sleeves depicted in FIGS. 7 and 8.

Figure 7:
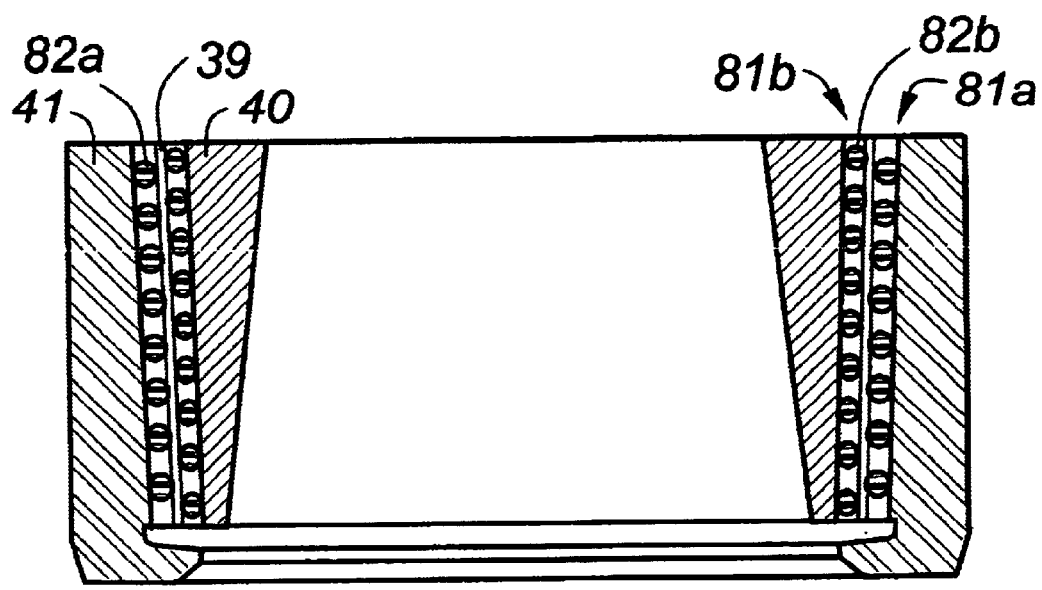
FIG. 7 illustrates an axial cross section of another embodiment of the elastomeric bearing sleeve wherein the elastomeric layers are constituted by circumferentially packaged rubber cords.

FIG. 7 shows an axial cross section of one modified embodiment of the elastomeric bearing sleeve. While having same intermediate sleeve-like metal layers 39, inner sleeve-like metal layer 40, and outer sleeve-like metal layer 41 as in FIGS. 5 and 6, each rubber layer 81a,b, instead of being a solid rubber layer, is constituted from circumferentially placed rubber cord layers 82a,b bonded to adjacent metal surfaces (of intermediate metal layers 39 and inner and outer metal layers 40 and 41, as appropriate). Instead of direct bonding, cords 82 can be immersed into soft (e.g., foam) matrix which, in its turn, is bonded to the metal surfaces.

Figure 8:
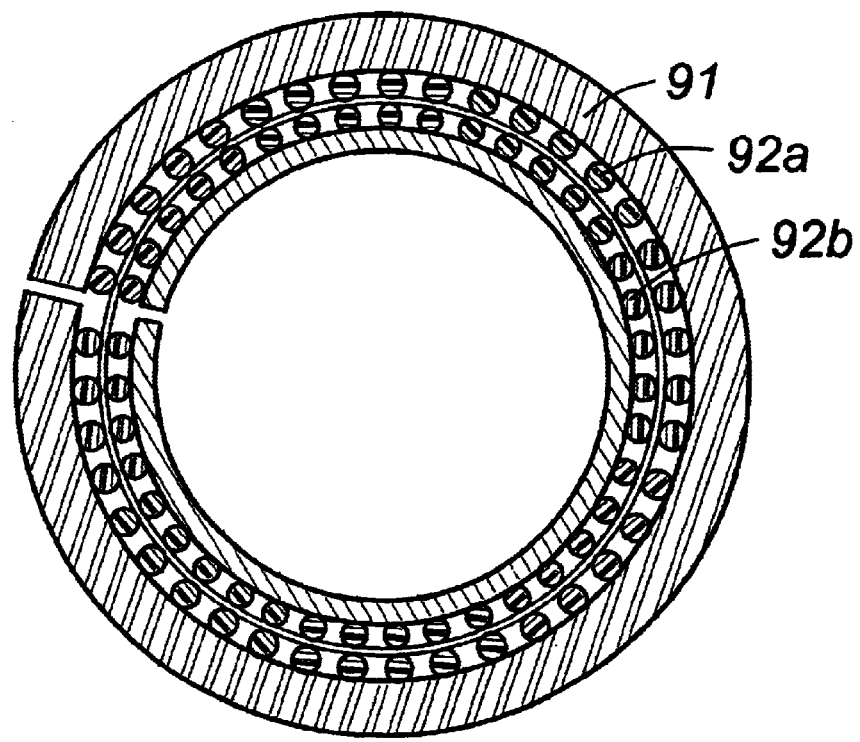
FIG. 8 shows a transverse cross section of another embodiment of the elastomeric bearing sleeve wherein the rubber cords are packaged axially.

FIG. 8 shows a transverse cross section of another modified embodiment of the elastomeric bearing sleeve. Similarly to FIG. 7, rubber layers 91 in laminated elastomeric bearing sleeve 37b are composed from rubber cord layers 92a,b, only in this case the cords are placed in the axial direction of the bearing sleeve. Obviously, any intermediate (at an angle to the bearing sleeve axis) placement of the rubber cords can be effected with similar results. The bonding alternatives are the same as described in relation to FIG. 7.

While different cord diameters are shown in rubber layers in FIGS. 7 and 8, identical cord diameters can be used for different layers. Obviously, this composition of the different elastomeric layers made from rubber cords can also be used in thrust bearings 48 in FIGS. 3 and 4.

When a universal joint equipped with elastomeric bearing sleeves as shown in FIGS. 7 and 8 transmits torque, the rubber cords are subjected to compression. It is known that radial compression of rubber cords is a nonlinear process characterized by increasing stiffness with the increasing load. The rubber cords can tolerate a very large relative compression in the radial direction under both static and dynamic loading and have superior fatigue resistance properties. The latter statement was confirmed by our tests comparing a temperature increase inside a rubber roller when loaded by axial compression and by radial compression with the same amplitude of sinusoidal compression force with frequency 20 Hz. The temperature increase in the radial compression test was recorded as about 50% of the temperature increase under axial force. High specific compression loads can be tolerated (although not as high as for solid rubber layers laminates). For 40% compression, the specific compression load on a cord made from a rubber blend with hardness (Shore durometer) H75, the specific compression load is 4.85 MPa (630 psi). While being significantly lower than the above quoted values for solid rubber layers laminates, this number would still result in universal joints rated similarly (for steady state operation) to commercially available universal joints with rolling friction bearings. Our tests have demonstrated that rubber cords have a low sensitivity to infrequent overloads and can safely endure even 100× overloads.

It is readily apparent that the components of the universal joint with elastomeric bearings disclosed herein may take a variety of configurations. Thus, the embodiments and exemplifications shown and described herein are meant for illustrative purposes only and are not intended to limit the scope of the present invention, the true scope of which is limited solely by the claims appended thereto.

What is claimed is:

1. A universal cardan joint with elastomeric bearings for connecting a pair of mechanical components, comprising:
    first and second yokes, each drivingly connected to one of said mechanical components, each yoke having two coaxial bores;
    an intermediate member adapted to be disposed in driving connection with said first and second yokes, said intermediate member having four legs which extend outwardly from a central body with the legs being displaced by 90 degrees from each other, each leg having a central axis, with all of the axes lying in a common plane, and the free end of each leg being trunnion-shaped;
    bearing sleeves disposed within each bore, each adapted to receive one of the trunnion-shaped ends of the extending legs of the intermediate member so as to join the two yokes through the intermediate member;
    each said bearing sleeve comprising at least one layer of an elastomeric material and metal layers disposed alternatingly and coaxially, with the outermost and innermost layers being metal layers, and the wall thickness of each of said bearing sleeves in its unloaded condition, before assembly into annular space between the internal surface of one of said bores and the external surface of one of said trunnions, being greater than the radial dimension of said annular space available for insertion of said bearing sleeve, whereby said bearing sleeves are under compression loading after assembly;
    at least one of external and internal metal surfaces of each said bearing sleeves being tapered and the corresponding surface inside said annular space is tapered at the conforming angle, so that said insertion of said bearing sleeve into said annular space is accompanied by wedge action between said conforming tapered surfaces thus resulting in reduction of wall thickness of said sleeve by compressing said elastomeric layers until the wall thickness of said sleeve equals the radial dimension of said annular space.

2. The universal cardan joint for connecting mechanical components of claim 1, wherein the parts of said bearing sleeves comprising said layers of elastomeric material being divided into separate segments with circumferential clearances between them, so that the total angular dimension of said segments around the circumference is less than 360 deg.

3. The universal cardan joint for connecting mechanical components of claim 2, wherein each said bearing sleeve comprises three said separate segments having equal angular dimensions and uniformly distributed around the sleeve circumference.

4. The universal cardan joint for connecting mechanical components of claim 2, wherein said circumferential clearances between said separate elastomeric segments are filled with a soft elastomeric material.

5. The universal cardan joint for connecting mechanical components of claim 1, wherein said elastomeric layers of said bearing sleeves comprise multiple cylindrical cords made from an elastomeric material and attached to said intermediate metal layers.

6. The universal cardan joint for connecting mechanical components of claim 1, wherein said elastomeric layers of said bearing sleeves comprise multiple cylindrical cords made from an elastomeric material immersed into soft elastomeric matrix.

7. The universal cardan joint for connecting mechanical components of claim 1, wherein at least one of the innermost and outermost metal layers comprising said bearing sleeve is made thicker than intermediate metal layers of said bearing sleeve.

8. The universal cardan joint for connecting mechanical components of claim 7, wherein each of said thicker metal layers comprise at least two metal components.

9. The universal cardan joint for connecting mechanical components of claim 1, wherein at least one of the innermost and outermost metal layers of said bearing sleeve is split along its length.

10. The universal cardan joint for connecting mechanical components of claim 1, wherein axial displacements between said trunnions and said bores are restrained by elastomeric thrust bearings comprising alternating elastomeric layers and metal layers.

11. The universal cardan joint for connecting mechanical components of claim 1, wherein said layers of an elastomeric material and said metal layers are conforming to cylindrical surfaces coaxial with said trunnions.

* * * * *